Feb. 27, 1940. C. L. OTTO, JR 2,192,148
DIRECTION INDICATOR
Filed Nov. 6, 1935 3 Sheets-Sheet 1

INVENTOR
Carl L. Otto, Jr.
BY
ATTORNEY

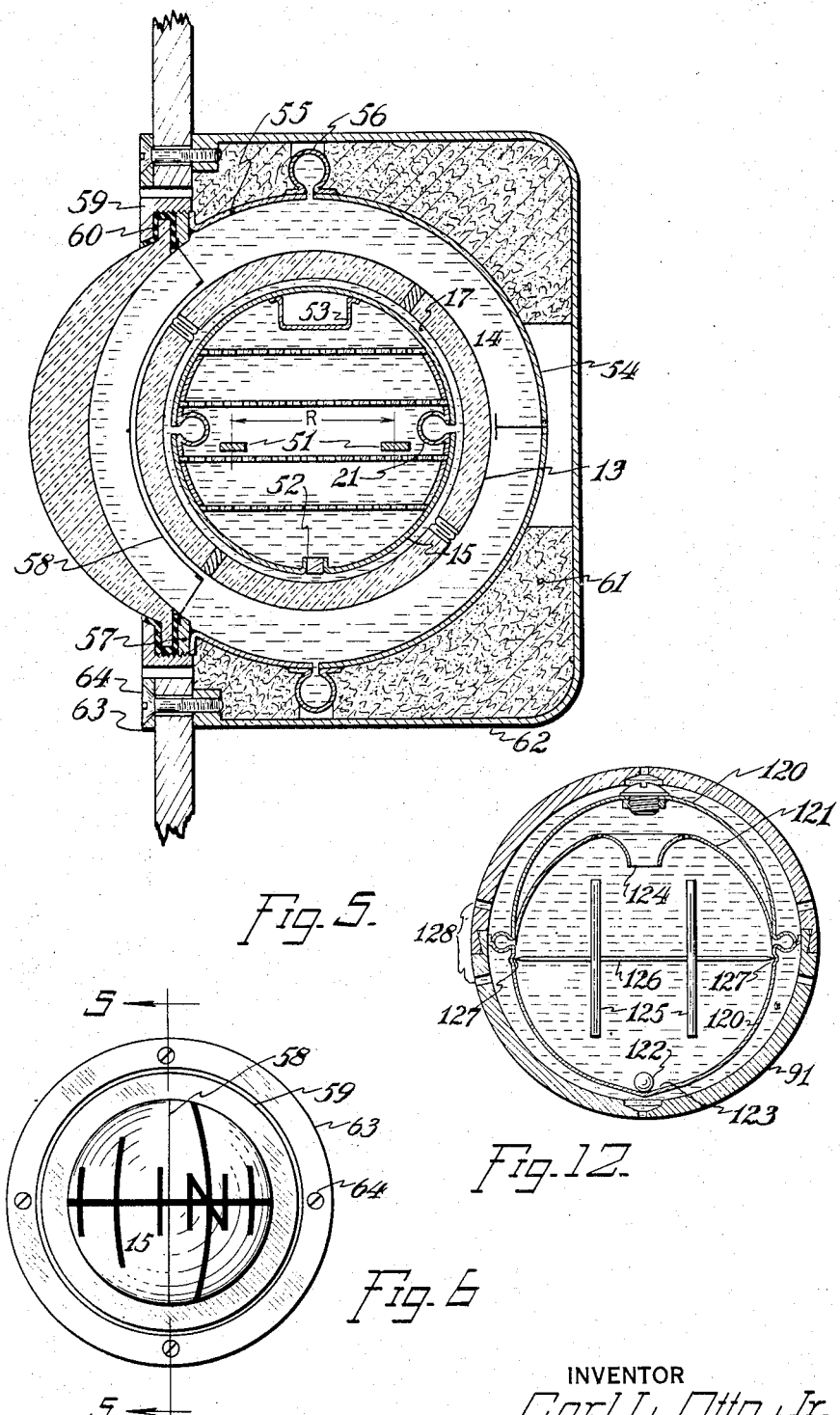

Feb. 27, 1940.          C. L. OTTO, JR                2,192,148
                     DIRECTION INDICATOR
              Filed Nov. 6, 1935          3 Sheets—Sheet 3

INVENTOR
Carl L. Otto, Jr.
BY
ATTORNEY

Patented Feb. 27, 1940

2,192,148

UNITED STATES PATENT OFFICE 2,192,148

DIRECTION INDICATOR

Carl L. Otto, Jr., West Hempstead, N. Y.

Application November 6, 1935, Serial No. 48,481

13 Claims. (Cl. 33—222)

This invention relates to direction indicating instruments, and is particularly concerned with a novel means of carrying or supporting the direction indicating element of such an instrument.

The problem presenting itself in directional instruments such as compasses, turn indicators, bank indicators, artificial horizons and the like, when used on a moving vehicle subject to relatively violent movements due to control or external influences, amounts in large degree to the means by which the directive element is carried, so that it will be influenced to the least possible extent by forces other than the directing force, and so that, when displaced from a true direction indication, it will return quickly to the true direction. The prior art shows numerous types of directive instruments, most of which include mechanisms requiring a high degree of precise machine work and adjustment to cause them to operate satisfactorily, resulting in high cost and a requirement of frequent adjustment and calibration.

Objects of my invention are (a) to provide a novel means of mounting the directive element of an instrument, (b) to provide a hydrostatically balanced fluid suspension for a directive element, (c) to provide an instrument having a directive element suspended in a fluid medium of substantially equal specific gravity to the specific gravity of the element, whereby mechanical support for the element is unnecessary, (d) to provide an element hydrostatically suspended and out of direct contact with, a container filled with a fluid of appropriate density, (e) to provide a massive element hydrostatically suspended within a container for free movement relative thereto, (f) to provide a device according to (e) above, wherein a directive element is hydrostatically suspended within the massive element and is capable of damped movement relative thereto, (g) to adjust the mass relationships of the several parts of the instruments so as to eliminate undesired effects of forces to which the instrument is not intended to be responsive, and (h) to provide certain means and structures to accentuate the action of an indicating element when same is responding to those forces to which it is intended to be sensitive.

Further objects include the adaptation of various types of directive instruments, such as bank, turn, inclinometer, horizon and others into either separate or combination instruments, utilizing the hydrostatic suspension and mass adjustment principles of the invention. As the specification proceeds, it will become apparent that instruments according to the invention may be easily and reasonably fabricated, and that the principles established will lend themselves to a variety of other uses. Further objects will become apparent also, with regard to details of construction of various embodiments of instruments by which their use is made wholly practicable.

In the drawings, Fig. 1 is a section through a simple form of instrument embodying the principles of the invention;

Fig. 5 is a section through a panel mounting compass;

Fig. 6 is a front view of the compass of Fig. 5;

Fig. 12 is a section through an alternative structure adapted for use in an instrument of the type shown in Fig. 7.

Figure 1:
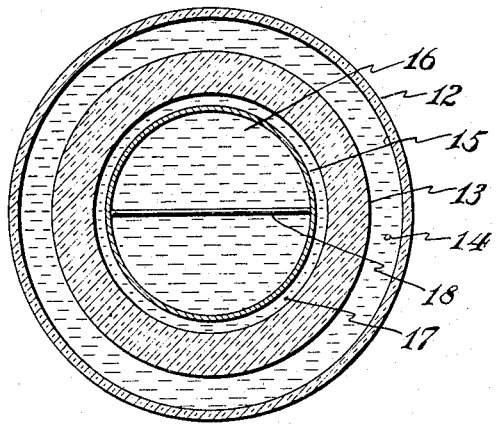

Fig. 1 represents a simple form of instrument illustrative of the principles of hydrostatic suspension which I use. To make this principle clear, let us assume a spherical container completely filled with any fluid. The fluid, filling the sphere, at all times moves bodily therewith, and translation of the sphere in any direction will cause no relative movement or displacement of the fluid molecules. Should the sphere be rotated, the fluid, however, will not rotate bodily therewith, due to the inertia of its mass, until the fluid friction due to continued rotation has gradually resulted in rotational movement of the fluid. The rotation of the fluid takes place slowly—very slowly when a fluid of low viscosity is used, and if the specific gravity of the fluid is high as well, there is a still greater resistance to rotation. Presuming that the sphere is started in uniform rotation, the outer layers of the contained fluid are first gradually set in motion, which motion is gradually transmitted to the whole fluid mass. If the sphere is subjected to oscillating movement, only the outer layers of the fluid will oscillate with the sphere, the central mass of the fluid remaining stationary.

Now if a smaller sphere be contained concentrically within the larger one, the smaller sphere having a mass-volume ratio exactly equal to the specific gravity of the fluid, the smaller sphere will act in a manner similar to the first assumed central fluid portion. Namely, the smaller sphere will not move relative to the container when the latter is translated, and the smaller sphere will lag far behind the container when rotation is imparted to the container. Mathematical computations may be set up to predict the time lag of the inner massive sphere and to obtain optimum lag conditions, taking into account the relative sphere diameters, moment of inertia of the inner sphere, viscosity and specific gravity of the fluid (the specific gravity being equal for the inner sphere) and the inertia of the fluid as movement is progressively induced therein from the rotating outer sphere inwards. The degree of lag of the inner sphere relative to the outer sphere is increased by a fluid of low viscosity, is increased by an inner sphere having large moment of inertia, and is decreased by a closer spacing of the outer wall of the inner sphere to the inner wall of the container. The relationship of sphere diameters then becomes important, and by evaluating the thickness of the fluid layer with respect to inner sphere diameter, it is generally found that an optimum lag condition is obtained when the inner sphere diameter is substantially less than the inner diameter of the container. This relationship is only cited for illustration and is not to be construed as a limitation, since fluids of different viscosities and specific gravities than those already considered may bring forth optimum lag conditions with different diameter relationships.

Appropriate fluids of low viscosity and high specific gravity are listed herewith. A consideration in fluid selection includes low coefficient of thermal expansion and wide range of temperature between freezing and boiling states, so that the instrument remains operative during all variations in climatic temperature:

Methylene bromide, methyl iodide, ethyl bromide, carbon disulfide.

In Fig. 1, 12 designates a spherical container of suitable material, such as glass. Concentrically contained therein is a massive sphere 13 having an outer diameter substantially less than the diameter of the container 12, the space 14 between the spheres being filled with a suitable heavy, non-viscous fluid. The sphere 13 then, is hydrostatically suspended within the sphere 12. The sphere 13 contains a spaced concentric spherical indicating element 15, having a fluid 16 therewithin; another fluid 17 fills the space between the spheres 13 and 15. The element 15 with its contained fluid has a specific gravity the same as the fluid 17. The spheres 13 and 15, and the fluids 1 and 17, together are organized to have a specific gravity the same as the fluid 14.

The sphere 13, then, will at all times move translationally in any direction with the sphere 12, without disturbing the concentric relationship, and the sphere 12 may move rotationally in any direction without disturbing the position of the sphere 13 except with protracted unidirectional rotation of the container 12. This latter condition would be most infrequent in any normal service to which a direction instrument might be subjected. Ordinarily, consecutive unidirectional turns would seldom exceed one complete turn and most conditions would impose oscillating movement on the sphere 12 which would not affect the sphere 13 at all. The latter sphere should be made of a transparent material, such as glass, which has a specific gravity of about 2.5. The fluid in the outer space 14 may be of equivalent specific gravity, although a precise equality may be difficult of attainment. Compensation, to attain equality when the fluid has a specific gravity divergent from the sphere 13, is accomplished by filling the sphere 13 with a fluid having a specific gravity appropriate to effect the desired hydrostatic balance. The directive element 15, which may, for instance, have a compass needle 18, is similarly hydrostatically balanced within the sphere 13. The clearance between elements 13 and 15 is shown as being small, whereby a substantial fluid damping effect is induced between the elements. Since the element 13 is relatively stationary, and since the directive element 15 is subject to movements induced by means other than forces affecting the element 13, this fluid damping effect makes the directive element "dead beat", reducing fluctuation and oscillation thereof. If desired, the directive element could in certain cases be directly attached to the sphere 13. Suitable indicia are inscribed on the element 15, visible through the transparent spheres 12 and 13. The mass and specific gravity of the directive element are considered in the design of the instrument, to obtain the hydrostatic balance required.

Figure 3:
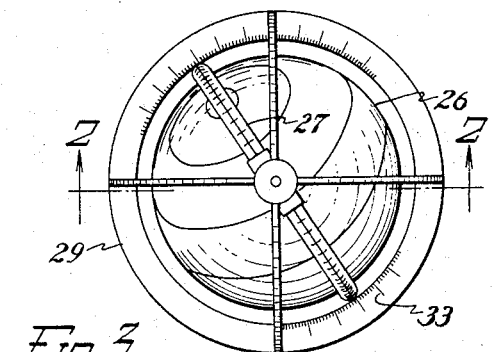
Fig. 3 is a plan of the instrument of Fig. 2.
Figure 4:
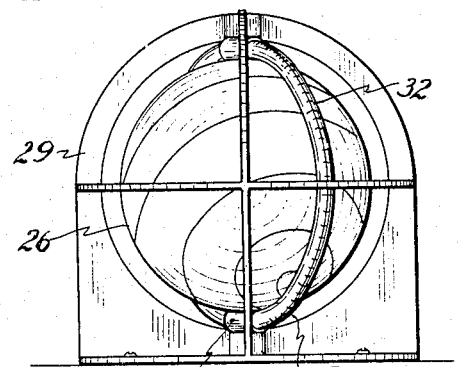
Fig. 4 is a side elevation of the instrument of Fig. 2.
Figure 2:
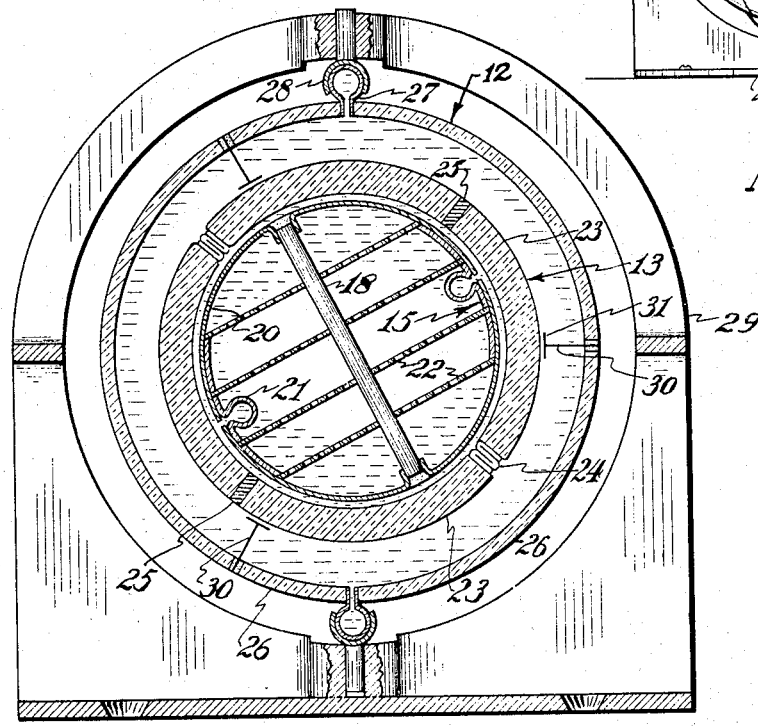
Fig. 2 is a section through an instrument organized as a magnetic field direction indicator.
Figure 9:
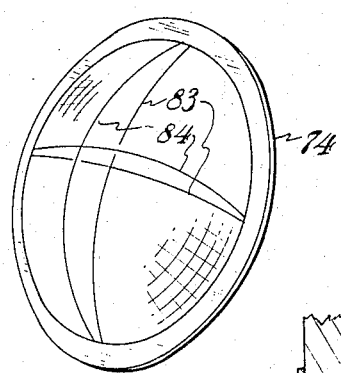
Fig. 9 is a perspective view showing the lens of the instrument of Fig. 7.
Figure 10:
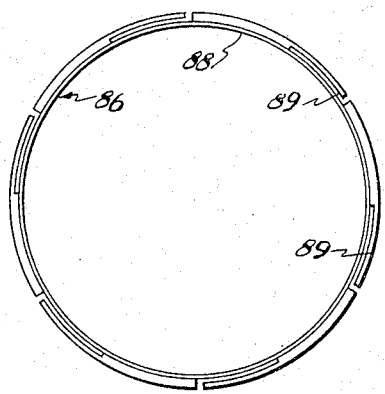
Fig. 10 is a plan of the accelerometer element.
Figure 7:
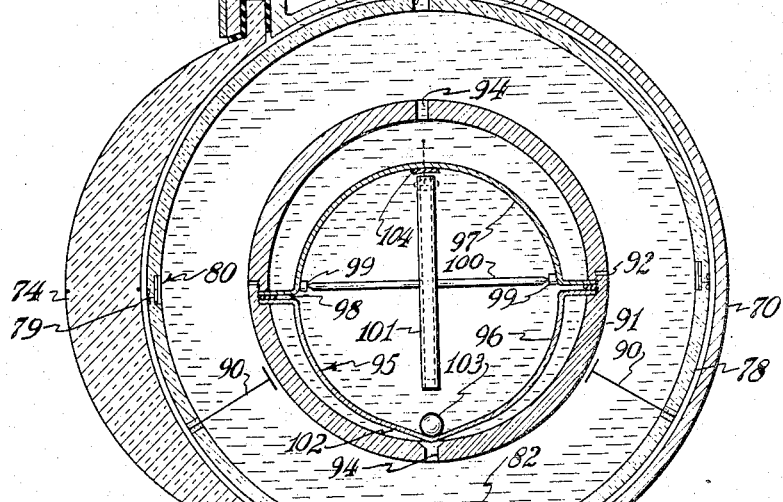
Fig. 7 is a section through a panel mounting combination instrument embodying compass, bank, horizon and accelerometer features.
Figure 11:
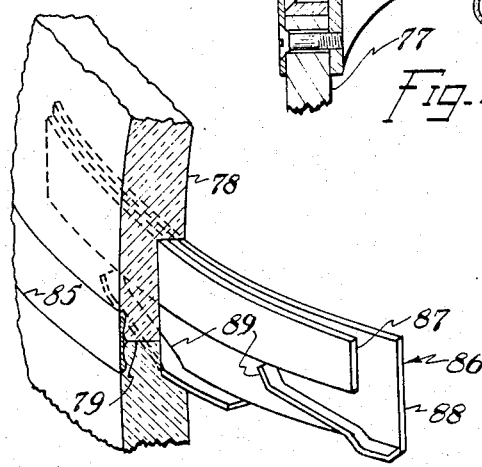
Fig. 11 is an enlarged fragmentary section of a portion of Fig. 7.
Figure 8:
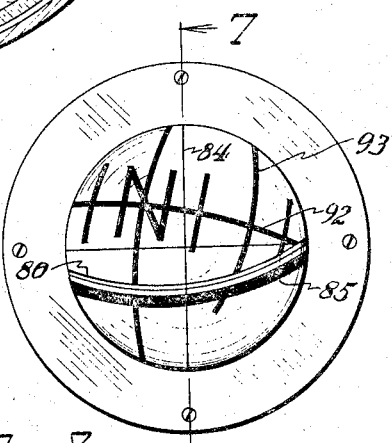
Fig. 8 is a front view of the instrument of Fig. 7.

Figs. 2, 3 and 4 show a form of instrument in which essential devices for assembly and practical use have been incorporated. The directive element 15 comprises metal hemispheres 20 joined by an expansible annular diaphragm 21. The compass needle 18 is on a sphere diameter normal to the great circle formed by the diaphragm 21, and a plurality of parallel perforate baffles 22 are mounted within the sphere to damp, through the action of the fluid in the element 15, movements of the element particularly in directions which would tend to angularly displace the needle 18. The massive element 13 comprises glass hemispheres 23 joined through a fluid-tight expansible annular diaphragm 24. Holes are provided in the hemispheres 23, filled after assembly with plugs 25, for filling the sphere, the element 15 having been assembled before joining the diaphragm 24 to the hemispheres 23. The assembled sphere 13, with contained fluids and elements, is then placed in the outer sphere 12 comprising hemispheres 26 joined by a flexible toroidal diaphragm 27 which forms a mounting ring held by clips 28 swivelly mounted in the mounting structure 29.

Support pins 30, having small flat heads 31, or heads of other suitable shape, are mounted within the hemispheres 26 to hold the sphere 13 in concentric relation during assembly. These pins are of minute size to reduce fluid friction, and the heads 31 provide a relatively frictionless support for the sphere 13, since, after assembly, the outer sphere 12 may be rotated to induce fluid flow between the heads 31 and the sphere 13. The curvature of the sphere, against the flat head 31, forms a wedge-shaped fluid entraining space, and thus, the sphere will become equally separated from all of the several heads 31 by equalization of local pressure between the several heads and the sphere, whereupon the sphere 13 is wholly out of contact with the heads 31, when the instrument is in use.

The fluids and materials for the instrument are so selected that perfect hydrostatic balance is maintained throughout variations in temperature with consequent expansion and contraction of the fluids and elements. It is well known, of course, that the specific gravity of materials generally vary with their temperature. It is, then, with the known material characteristics, relatively simple to proportion interior fluids and structures so that their aggregate specific gravity, when subjected to a finite temperature change, varies in the same proportion as the specific gravity of the suspending fluid when subjected to the same temperature change. The expansible diaphragms permit of expansion and contraction of the structures, the material of which generally would have lower coefficients of expansion than the fluids.

The instrument of Figs. 2, 3 and 4 comprises a magnetic field direction indicator. Suitable latitudinal circles are inscribed on the element 15, and likewise on the containing sphere 12. By aligning the respective latitudinal circles, by angularly moving the sphere 12 in the clips 28 and by turning the sphere relative to the mount 29, readings of angle of magnetic dip and bearing may respectively be taken from suitable scales 32 and 33 inscribed on the annulus 27 and the mount 29, respectively.

Figs. 5 and 6 show a compass built according to the principles of the invention, adapted for panel mounting and direct reading. Here, the directive element 15 includes the expansible diaphragm 21, and baffles 22 as in Fig. 2, but a pair of spaced parallel compass needles 51 are utilized. The spacing R between the needles is such that the needles together have the same moment of inertia about any coplanar central axis. A small weight 52 is attached centrally in one of the hemispheres 20 to hold the great circle formed by the diaphragm 21 substantially horizontal, offsetting the vertical component of the earth's magnetic field. To compensate the weight 52 in order that hydrostatic balance may be maintained, an empty cup 53 is attached centrally of the upper sphere 20. The element 15, though hydrostatically stable, will be responsive in its absolute position relative to the horizon, to resultant forces acting through the center of the instrument. When static, then, the diaphragm will lie in a horizontal plane, but when used, for instance, in aircraft which are subject to other forces due to maneuvering, the element 15 will act as a bank indicator, the diaphragm taking a position corresponding to a normal to the resultant force acting on the aircraft. This indication, in a properly executed turn, will maintain the indicator in the same relation to the instrument casing as when the craft is in level, uniform flight. The instrument also serves in some degree as a horizon or angle of climb indicator, although its indications in these functions would only be trustworthy where any acceleration forces acting on the instrument are of very low magnitude, since the position indicator is responsive, in its angular position, to radially applied forces acting thereon which in aircraft, are frequently of a magnitude approaching or exceeding the force due to gravity.

When the indicator 15 is moved by variable forces (other than gravity and the force due to the earth's field acting on the compass magnets), the frictional drag between the indicator 15 and the massive sphere 13 will tend to rotate the latter; the mass of sphere 13 will resist such movement to damp movement of the indicator.

If slight motion is imparted to the sphere 13, it will tend to rotate beyond the new statically balanced state, tending to slightly overcontrol the indicator. Upon return of the indicator to normal, due to normalization of the forces acting thereon, the massive sphere will be stopped due to the opposite drag caused by the indicator, possibly in a position different from its original position which, however, is immaterial.

The sphere 12 of the instrument of Figs. 5 and 6 is principally of metal, comprising a metal hemisphere 54, to which a truncated hemisphere 55 is attached by an expansible annular diaphragm 56. A stout ring 57 is soldered or welded to the front of the truncated hemisphere 55, the diameter thereof being great enough to permit entry of the sphere 13. A concavo-convex lens completes the spherical form of the sphere 12, and a wire lubber line 58 is clipped between the lens and the ring 57. A union ring 59 and suitable packing 60 complete the lens joint. The whole instrument is preferably mounted in felt or sponge rubber 61 carried in a housing 62 adapted for panel attachment by a ring 63 and screws 64.

Figs. 7 through 12 show an instrument, and parts thereof, embodying certain novel principles in addition to those already described. This instrument is particularly adaptable for aircraft, and coordinates into one easily read device functions previously requiring the use of no less than four separate instruments, namely, a stable directional compass, an artificial horizon, a bank indicator, and an accelerometer. The one instrument thus gives all the information necessary to ascertain the attitude of an aircraft in "blind" or instrument flying. Although the general principles of construction and operation are essentially the same as previously described, the structures involved are different. An outer container, having a spherical interior surface, is composed of a hemispherical shell 70 and a truncated shell 71 joined to the shell 70 through an expansible annular diaphragm 72 and a flange connection 73. A concavo-convex lens 74 is suitably joined to the front of the shell 71 by a bezel 75, a flange 76 formed at the front of the shell 71 serving for mounting the instrument on a panel 77.

Closely spaced within the composite container is a shell 78 of glass, Celluloid or other single or composite transparent material having an appropriate specific gravity. The shell comprises two hemispheres joined along a great circle as at 79, the joint being organized to provide an accelerometer 80, described later in detail. A port 81 is formed in the top hemisphere, and a weight 82 is attached to the bottom hemisphere diametrically opposite the port. This shell is relatively light, so far as rotational moment of inertia is concerned, and when hydrostatically balanced within the container, is responsive to resultant radially acting forces imposed on the aircraft, thus serving as a bank indicator. The great circle formed by the juncture of the hemispheres provides an index read with reference to horizontal and vertical lubber line sets 83 and 84 inscribed, respectively, on the inner and outer surfaces of the lens 74. The accelerometer comprises a band 85, preferably black, circumscribing the joint 79 and mechanically reinforcing same, a spring ring 86, and a movable ring 87. The spring ring lies in a recess in the inner sphere surface, including a red band 88 of approximately twice the width of the band 85. Lower portions of the band 88 are bent ontwardly and upwardly to provide a plurality of circumferentially spaced spring leaves 89 upon which the movable ring 87 rests. The ring 87 is the same width as the band 85, and normally lies thereabove. The ring 87 is preferably white in color, and normally covers the red band 88. When great forces are imposed on the accelerometer, the ring 87 bears down, deflecting the springs 89 and uncovering a portion of the red band 88. The springs may be adjusted to cause a red band showing proportional to the number of gravity force factors imposed thereon, or may be adjusted to hold the red band invisible until a specific number of gravity forces have been exceeded. For instance, an aircraft designed to 10 g acceleration may have its instrument adjusted to show red at 8 g acceleration.

Support wires 90 with headed ends are appropriately spaced within the shell 78 to support, during assembly, a concentric, relatively massive, spherical shell 91, upon which are inscribed an equatorial great circle 92 and a plurality of normal great circle arcs 93. This shell is vented at 94, and comprises hemispheres joined along the great circle 92 and clamping between them, at the joint, a sphere 95 which is located eccentrically relative to the shell 91. This sphere 95 comprises halves 96 and 97 with flexible flanges 98 clamped between the halves of the shell 91, to provide an expansion diaphragm. The upper half 97 is provided with opposed bearings 99 supporting a spindle 100 on which is mounted a compass magnet 101. By the spindle mounting, the magnet may find its own inclination in the earth's field without exerting a tilting force on the sphere 91, but will turn the sphere 91 in azimuth to form a true reading directional instrument. By virtue of the fluid mounting and hydrostatic balance, the sphere 91 will not be appreciably displaced by any ordinary maneuver of the aircraft, and will give a true reading at all times; though in certain attitudes of the craft an accurate directional reading will be difficult, such a reading may easily be made as soon as the craft regains a reasonably level attitude. The lower, outermost half 96 of the eccentric sphere 95 is provided with a conical depression 102 the sides of which are tangent to the sphere. A ball 103 is placed within the sphere for free movement therein except as such movement is damped by the fluid within the sphere. A counterweight 104 is arranged diametrically opposite the depression 102, or alternatively, the top half 97 of the sphere may be of greater thickness or of heavier material than the lower half 96, so that the assembly comprising sphere 95 is exactly balanced about the center of the sphere 91. Likewise, means will be provided to effect coincidence of the center of buoyancy with the center of the sphere 91. Thus, with the ball 103 omitted, the center of gravity, and the center of buoyancy will be coincident with the center of sphere 91. When the ball is assembled and is lying in the depression 102, the assembly will tend to remain in the upright position shown. The function of the ball and eccentric sphere is to right the sphere 91 gradually should it become rotationally displaced from an upright position and yet, not to provide a fixed eccentric weight which would tend to move the sphere 91 appreciably when it is subjected to lateral acceleration forces. When accelerations having a horizontal force component are imposed on the instrument, said horizontal component, if of sufficient magnitude, will move the ball out of the conical depression and along the eccentric sphere surface without substantially rotationally displacing the sphere 91. When the horizontal force ceases or changes direction, the ball will roll along the sphere surface without appreciably effecting sphere rotation. Should a horizontal force component last an appreciable length of time, the ball will proportionately press against the sphere surface which, by virtue of the sphere surface eccentricity, will cause an unbalanced rotational force on the sphere, eventually turning it so that the depression 102 with the ball therein, will eventually become aligned with the direction of action of the acceleration force. However, it is intended that the sphere rotating effect of the ball 103 will be very light so that a force would have to be applied over a period of several minutes to align the sphere poles with the force direction. Thus, in any flying at all likely to be encountered, the only acceleration force acting in one direction for a protracted period is that of gravity, so that the sphere 91 will always tend to stay in, or return to, a position wherein the poles thereof are aligned on a normal to the earth's surface. The loose ball and eccentric sphere provide a means for righting the sphere due to a steadily imposed force and for minimizing overturning of the sphere due to strong other forces of short duration. The sphere 91 is, as shown, widely spaced from the sphere 78 and has a considerable rotational inertia, whereby the sphere 78 may move freely around the sphere 91 without moving the latter. The sphere 91 is preferably made from material of high specific gravity, the hydrostatic balance thereof, in the surrounding fluid, being compensated by the use of a fluid of low specific gravity within the eccentric sphere 95.

Fig. 12 shows an alternative construction which may replace the contents of the sphere 91, the alternative providing an improved construction to compensate overturning tendencies of the sphere induced by fluid drag caused by rapid movements of the sphere 78. Herein, a pair of similar half shells 120 are clamped in opposed relation between the halves of the sphere 91. These shells have a special cam shape increasing in radial distance from the sphere center, from a certain minimum distance at the sphere equator to a maximum distance in alignment with the sphere poles. With a fluid within the shells 120 different in specific gravity from the fluid without the shells, the center of buoyancy is maintained coincidental with the sphere 91 due to the symmetry of the shells. Now, a special cam shell 121 is attached at its circular edge along the sphere equator and is formed so as to have a constantly diminishing radial distance from said equator to the upper pole, as measured to the sphere center. The shell 121 and the lower shell 120, then, together form a substantially heart-shaped cam upon which the free ball 122 may travel. Likewise, the shell 121, considering the assembly without the weight of the ball, forms a slight overbalance whereby the center of gravity of the shell 91 and contained elements, is slightly above the center of the sphere 91, this overbalance being augmented by a fluid tight filler plug at the apex of the top shell 120. The ball 122 is of sufficient weight so that, regardless of its position along the cam shells and the rotative position of the sphere 91, the effective center of gravity of the assemblage will be slightly below the center of the sphere 91, that is, toward the depression 123.

In operation, assume that an acceleration force is imposed on the instrument from left to right.

This will cause the bank indicator (78, Fig. 7) to swing clockwise, inducing a fluid drag tending to turn the sphere 91 likewise. However, the ball 122 will move relatively freely from the depression 123 toward the left, and while in motion, will have virtually no righting effect. Simultaneously, the sphere 91 will be urged to turn counterclockwise by virtue of its high center of gravity when the ball is not acting. Thus, the fluid drag turning effect is compensated by a counter turning effect in the sphere 91. Ordinarily, the aircraft and instrument will shortly return to equilibrium, and the ball will roll back to the depression 123. Should the horizontal force be continued in one direction for a long period, the ball 122 will eventually turn the sphere 91 to the position whereat its poles are aligned with the resultant force. Should such an upset occur, even to the extent where the sphere is overturned so that the shell 121 is at the bottom and the shell 120 on top, the ball will act on the cam surfaces of these shells to eventually right the sphere, even though the sphere is overbalanced statically. This effect is produced by the shape of the cam surfaces and the action of the ball thereon, the ball always exerting a force tending to turn the sphere until the ball reaches the depression 122. It will be noted that the apex of the shell 121 is inturned, to prevent the ball ever reaching a static "dead center" position should the sphere come to rest 180° out of normal position. This apex may conventionally be provided with an orifice 124 to permit of fluid pressure equalization throughout the interior of the two shells 120.

In this embodiment, paired, spaced compass magnets 125 are carried on a spindle 126 borne at its ends in spindle bearings 127 carried adjacent the periphery of the shell 121. Fluid vents 128 are formed in the sphere 91, whereby temperature changes are assumed by the joint between the shells 120. The plug in the top shell 120, and the orifice 124 in the shell 121, provide means for assembling the ball 122 as well as filling the shells with fluid. Another alternative construction contemplates forming the halves of the massive shell 91 with the interior cam faces as part thereof, rather than using the separate shells 120 and 121.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

What is claimed is:

1. An instrument comprising a plurality of at least three concentric hollow spheres at least two thereof each hydrostatically suspended one within the next outer sphere, and fluids filling the several inter-sphere spaces each having a specific gravity equivalent to the aggregate mass-volume ratio of the within spheres and fluids.

2. In an indicating instrument, a spherical support, a transparent spherical primary element of high inertia, hydrostatic means for supporting said primary element in said support for unlimited rotation in all directions with respect thereto with substantially no transfer of kinetic energy therebetween, a secondary spherical element of low inertia closely spaced within said primary element, and hydrostatic means for supporting said secondary element within said primary element for unlimited rotation in all directions with respect thereto and with a substantial transfer of kinetic energy therebetween.

3. An indicating combination instrument including, in combination, a plurality of concentric spheres separated by fluids each of whose density is equivalent to the mass-volume ratio of the contained spheres and fluids, said spheres being relatively movable according to the degree of damping imposed thereon by fluid friction, one said sphere having a directional element having a force component adapted to urge said sphere to a definite position about a vertical axis and being adapted by its mass and free suspension to maintain an index thereon in a fixed attitude, and another of said spheres having a weight eccentric to the sphere center organized to turn the sphere in the direction of externally imposed forces.

4. A bank indicator and compass comprising a first spherical member having a transparent portion, a second thin wall spherical member within and closely spaced relative to the first member and having an eccentric center of gravity for normally maintaining said second sphere in alignment with a resultant radial force imposed thereon, and a third spherical member of relatively thick wall and high rotational inertia widely spaced within said second sphere, each said sphere being hydrostatically balanced within the next outer sphere by fluid within the inter-sphere spaces, each fluid having a specific gravity respectively equivalent to the mass-volume ratio of the suspended sphere and its contained elements.

5. In an indicating instrument, a container element having a smoothly spherical interior surface, a fluid substantially filling said container, an element immersed in and supported by said fluid free for unlimited rotation in any direction relative to the container element, the surfaces of said element being widely spaced from the interior surface of said container element, and deformable resilient filaments attached to one said element and extending nearly to the other said element, and lying along lines radiating from the center of said elements, said filaments being of such minute thickness as to cause a minimum of fluid friction between the elements and fluid upon relative motion thereof while serving to centralize one element with respect to the other.

6. An instrument comprising a plurality of concentric hollow spheres each hydrostatically sustained one within the next outer sphere, and fluids filling the several inter-sphere spaces each having a specific gravity equivalent to the aggregate mass-volume ratio of the contained spheres and fluids, the several spheres of the assembly being provided with expansible means to permit change in the volume thereof upon temperature changes in proportion to the expansion of contained elements and fluids, by which the weight-volume ratio of each fluid and its contained sphere is proportionally maintained throughout said temperature changes.

7. A device including in combination, a container having a smoothly spherical interior surface, a fluid substantially filling said container, a freely rotatable member hydrostatically suspended in said fluid, and means for automatically adjusting the buoyancy of said member including a fluid-tight expansible chamber forming a part of said member and having a liquid enclosed therein, said container being adapted to rotate at least a complete revolution about said member in any direction without disturbing said member.

8. A direction indicator including a fluid-immersed substantially closed movable member having an axis of gravitational stability, a magnet pivoted within said member about an axis fixed relatively thereto to rotate in a plane parallel to or including said axis and automatically to align the magnet poles with the dip and azimuth of the earth's magnetic field, and means for automatically adjusting the buoyancy of said member, including a fluid-tight expansible container within said member and having a liquid enclosed therein.

9. A combination flight instrument for aircraft comprising a relatively massive hollow sphere, a cam surface formed therewithin, a weight freely movable over said cam surface normally tending to urge said massive sphere, by influence of gravity on said movable weight, to a predetermined attitude with respect to the vertical, a magnet carried by said massive sphere forming a directive element therefor, said sphere having indicia on the surface thereof, and fluid means holding said massive sphere in hydrostatic suspension for free movement under the influence of said weight and magnet.

10. A combination flight instrument for aircraft comprising a relatively massive hollow sphere, a cam surface formed therewithin, a weight freely movable over said cam surface normally tending to urge said massive sphere, by influence of gravity on said movable weight, to a predetermined attitude with respect to the vertical, a magnet carried by said massive sphere forming a directive element therefor, said sphere having indicia on the surface thereof, and fluid means holding said massive sphere in hydrostatic suspension for free movement under the influence of said weight and magnet, said magnet being pivoted to permit dipping thereof relative to the sphere without imposing a vertical twisting couple on said massive sphere.

11. An aircraft flight instrument for indicating a pre-set course including, in combination with a transparent spherical support, a dip magnet within said support having free universal rotation with respect thereto, a spherical shell within said support and connected to said dip magnet and bearing a set of parallel indicia at intersections of its surface with imaginary spaced parallel planes normal to the polar axis of said magnet, a second set of similar indicia upon said support, and means mounting said support for movement about two mutually normal axes to obtain parallelism of the two sets of indicia for any given orientation of the aircraft.

12. In an attitude indicating flight instrument for aircraft having an elongated index having its principal dimension disposed in a plane substantially normal to the direction of strong acceleration forces to which the instrument is subjected, a weight in the form of a narrow strip parallel to and adjacent to said index, and spring means supporting said weight, said means being of such strength as to be compressed by said weight at a given dangerous rate of acceleration of the aircraft, thereby constituting a warning signal by relative parallel translation between said index and strip.

13. In an indicating instrument, in combination, a pendulous member freely supported within a housing, said housing being free for unlimited movement in any rotational sense relative to the member, a window in said housing for observing the position of the member relative thereto, an index on said member comprising relatively movable bands positioned in parallel planes, and resilient means urging said planes toward one extreme relationship transversely, said planes being movable away from said extreme by resultant forces of acceleration imposed upon the instrument, and providing by said movement an accelerometer readable coincidently with a reading of the position of said member relative to the housing.

CARL L. OTTO, JR.